(12) United States Patent
Gudme et al.

(10) Patent No.: US 9,458,956 B2
(45) Date of Patent: Oct. 4, 2016

(54) FLEXIBLE ARMORED PIPE

(75) Inventors: Jonas Gudme, Humlebaek (DK); Kristian Glejbol, Glostrup (DK); Christian Ditlev Cappeln, Soborg (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 84 days.

(21) Appl. No.: 13/980,105

(22) PCT Filed: Jan. 19, 2012

(86) PCT No.: PCT/DK2012/050021
§ 371 (c)(1),
(2), (4) Date: Oct. 1, 2013

(87) PCT Pub. No.: WO2012/097823
PCT Pub. Date: Jul. 26, 2012

(65) Prior Publication Data
US 2014/0014218 A1   Jan. 16, 2014

(30) Foreign Application Priority Data

Jan. 20, 2011 (DK) .................................. 2011 00037
Feb. 14, 2011 (DK) .................................. 2011 00099

(51) Int. Cl.
*F16L 11/00* (2006.01)
*F16L 11/08* (2006.01)
*F16L 11/16* (2006.01)

(52) U.S. Cl.
CPC .............. *F16L 11/00* (2013.01); *F16L 11/083* (2013.01); *F16L 11/16* (2013.01)

(58) Field of Classification Search
CPC ......... F16L 11/00; F16L 11/083; F16L 11/16

USPC ..................... 138/118–139; 285/222.1–222.5
See application file for complete search history.

(56) References Cited

U.S. PATENT DOCUMENTS 2,136,770 A * 11/1938 Witzenmann .............. 285/147.1
3,311,133 A    3/1967 Kinander
(Continued)

FOREIGN PATENT DOCUMENTS

EP    1475560 A1   11/2004
FR    2 824 890 A1   11/2002
(Continued)

OTHER PUBLICATIONS

"Recommended Practice for Flexible Pipe" ANSI/API Recommended Practice, 17B, Fourth Edition, Jul. 2008.
(Continued)

*Primary Examiner* — Paul R Durand
*Assistant Examiner* — Vishal Pancholi
(74) *Attorney, Agent, or Firm* — Pearne & Gordon LLP

(57) ABSTRACT

The invention relates to a flexible armored pipe for transportation of fluids, comprising an inner sealing sheath and at least one displacement reduced armor layer comprising a plurality of elongate elements comprising at least a female type elongate element comprising at least one recess in each opposite side and a male type elongate element comprising at least one protruding tongue in each opposite side and wherein each of the female type and the male type elongate elements are substantially symmetrical in a symmetry line substantially normal to the inner sealing sheath when the pipe is in a non-bended state and where said protruding tongues of said male type elongate element windings are engaged in said recesses of adjacent female type elongate element windings.

27 Claims, 13 Drawing Sheets

(56) References Cited

U.S. PATENT DOCUMENTS

| | | |
|---|---|---|
| 3,687,169 A | 8/1972 | Reynard |
| 3,858,616 A | 1/1975 | Thiery |
| 3,908,703 A * | 9/1975 | Bournazel et al. ............ 138/120 |
| 4,326,561 A * | 4/1982 | Kutnyak ....................... 138/136 |
| 4,493,140 A | 1/1985 | Abdullaev et al. |
| 4,549,581 A | 10/1985 | Unno |
| 4,706,713 A | 11/1987 | Sadamitsu |
| 4,800,928 A * | 1/1989 | Kanao ........................... 138/122 |
| 5,213,637 A | 5/1993 | Mallen Herrero |
| 5,407,744 A | 4/1995 | Mallen Herrero |
| 5,601,893 A | 2/1997 | Strassel |
| 5,645,109 A | 7/1997 | Mallen Herrero |
| 5,669,420 A | 9/1997 | Mallen Herrero |
| 5,730,188 A | 3/1998 | Kalman |
| 5,813,439 A | 9/1998 | Mallen Herrero |
| 5,837,083 A | 11/1998 | Booth |
| 5,922,149 A | 7/1999 | Mallen Herrero |
| 6,016,847 A | 1/2000 | Jung |
| 6,024,135 A * | 2/2000 | Nobileau ...................... 138/134 |
| 6,065,501 A | 5/2000 | Feret |
| 6,085,799 A | 7/2000 | Kodaissi |
| 6,123,114 A | 9/2000 | Sequin |
| 6,145,546 A | 11/2000 | Hardy |
| 6,192,941 B1 | 2/2001 | Mallen-Herrero |
| 6,253,793 B1 | 7/2001 | Dupoiron |
| 6,282,933 B1 | 9/2001 | Dupoiron |
| 6,283,161 B1 | 9/2001 | Feret |
| 6,291,079 B1 | 9/2001 | Mallen Herrero |
| 6,354,333 B1 | 3/2002 | Dupoiron |
| 6,382,681 B1 | 5/2002 | Berton |
| 6,390,141 B1 | 5/2002 | Fisher |
| 6,408,891 B1 | 6/2002 | Jung |
| 6,415,825 B1 | 7/2002 | Dupoiron |
| 6,454,897 B1 | 9/2002 | Morand |
| 6,516,833 B1 * | 2/2003 | Witz ..................... F16L 11/083 138/120 |
| 6,668,867 B2 | 12/2003 | Espinasse |
| 6,691,743 B2 | 2/2004 | Espinasse |
| 6,739,355 B2 | 5/2004 | Glejbol |
| 6,840,286 B2 | 1/2005 | Espinasse |
| 6,889,717 B2 | 5/2005 | Coutarel |
| 6,889,718 B2 | 5/2005 | Glejbol |
| 6,904,939 B2 | 6/2005 | Jung |
| 6,978,806 B2 | 12/2005 | Glejbol |
| 6,981,526 B2 | 1/2006 | Glejbol |
| 7,024,941 B2 | 4/2006 | Andersen |
| 7,032,623 B2 | 4/2006 | Averbuch |
| 7,311,123 B2 | 12/2007 | Espinasse |
| 7,459,033 B2 | 12/2008 | Asahi |
| 7,487,803 B2 | 2/2009 | Lokere |
| 7,971,610 B2 * | 7/2011 | Booth .................... F16L 9/045 138/131 |
| 2003/0102044 A1 | 6/2003 | Coutarel |
| 2004/0221907 A1 * | 11/2004 | Glejbol et al. ................ 138/129 |

FOREIGN PATENT DOCUMENTS

| | | |
|---|---|---|
| GB | 1404394 | 3/1973 |
| WO | 00/36324 A1 | 6/2000 |
| WO | 01/61232 A1 | 8/2001 |
| WO | 01/81809 A1 | 11/2001 |
| WO | 2006/097112 A1 | 9/2006 |
| WO | 2008/025893 A1 | 3/2008 |
| WO | 2008/077409 A1 | 7/2008 |
| WO | 2008/077410 A1 | 7/2008 |
| WO | 2009/024156 A2 | 2/2009 |
| WO | WO 2010107995 A2 * | 9/2010 ............ F16L 11/082 |

OTHER PUBLICATIONS

"Recommended Practic for Flexible Pipe" API Recommended Practice 17B Second Edition, Jul. 1, 1998.
"Specification for Unbonded Flexible Pipe", API, 17J, third edition, Jul. 2008.
DK-PTO search report and opinion of Sep. 9, 2011.
Extended European Search Report for EP 12 73 6412 dated Mar. 3, 2015.

* cited by examiner

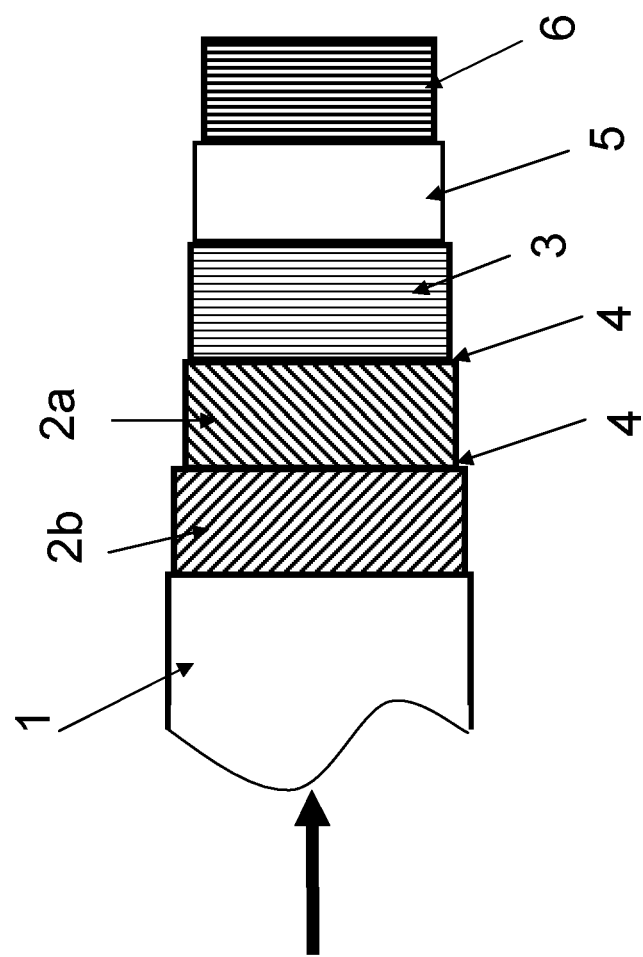

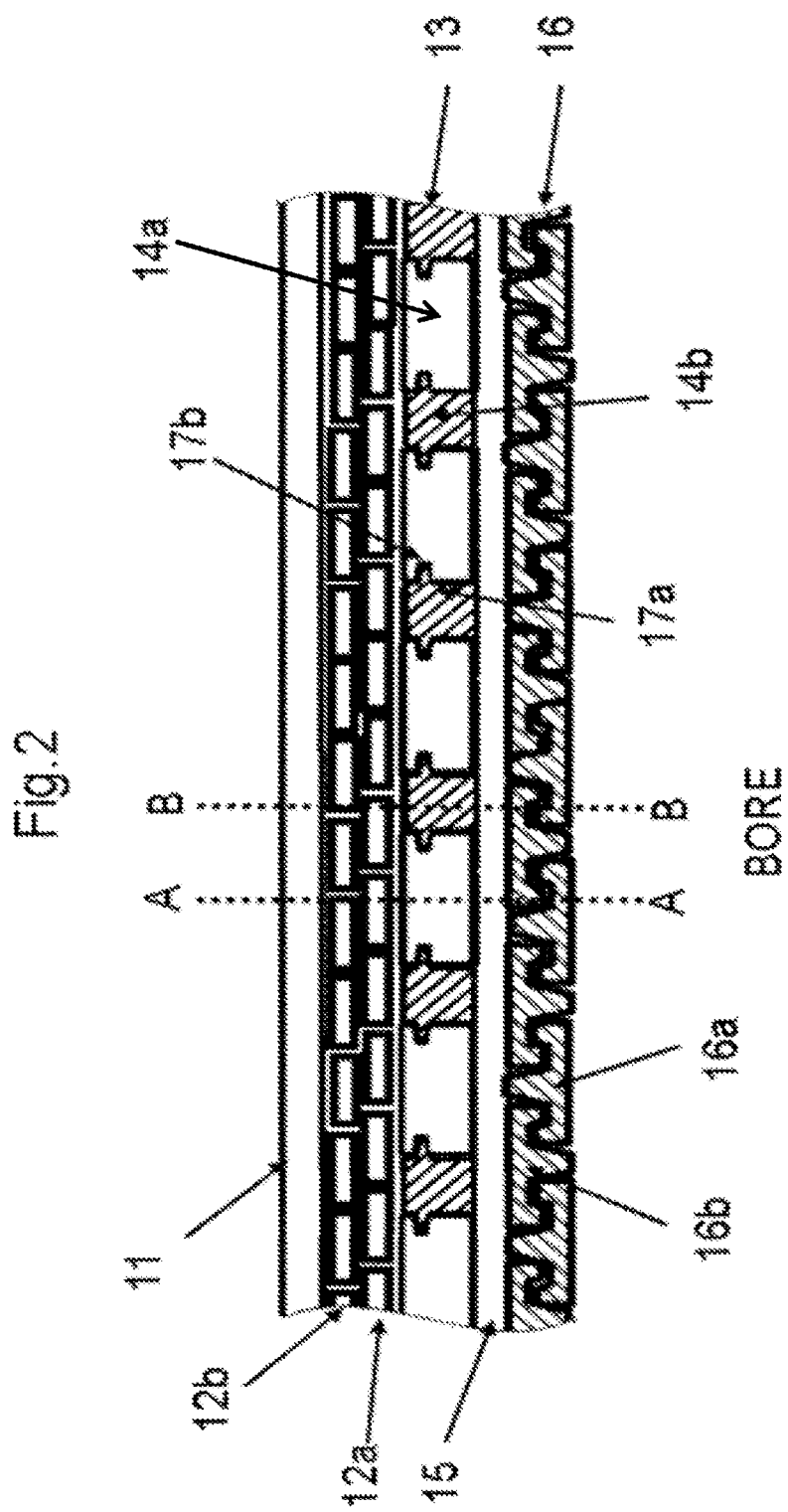

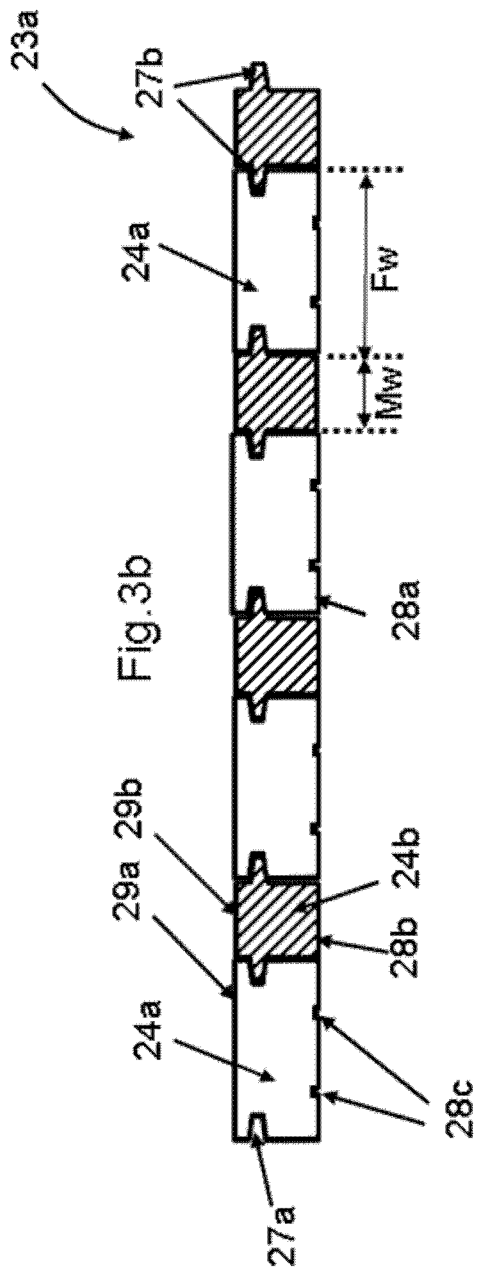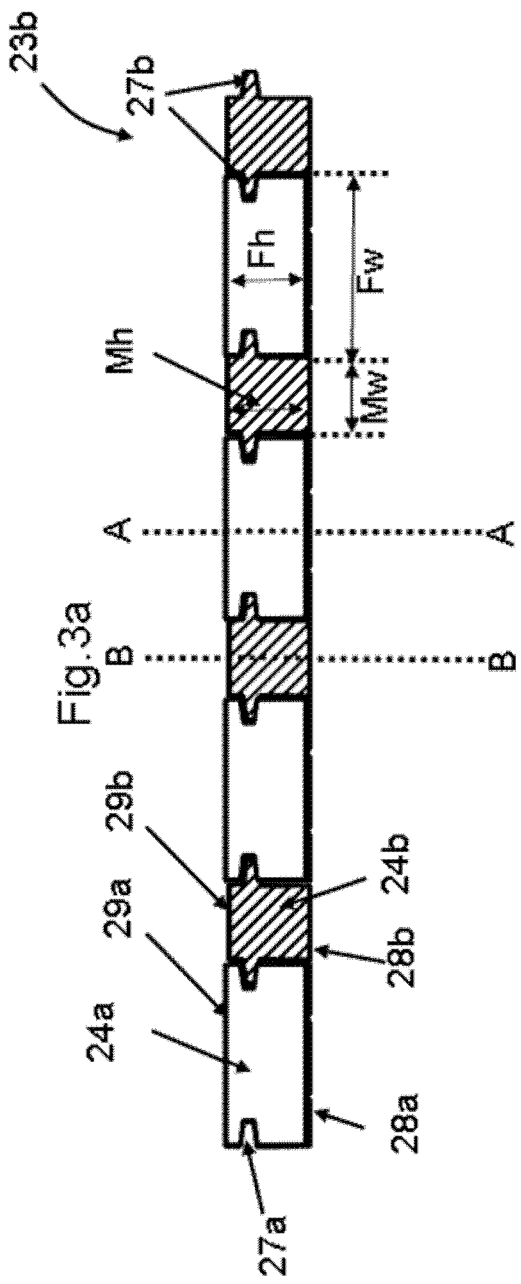

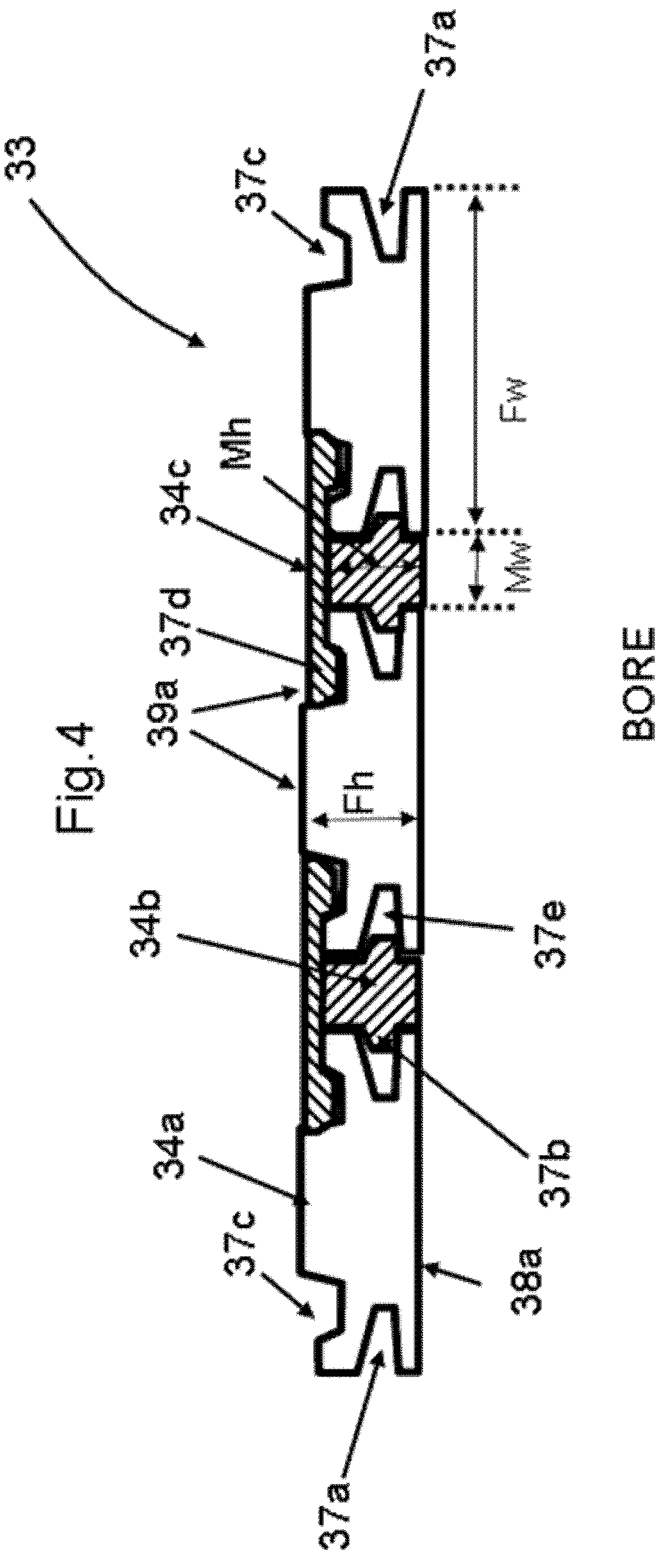

FLEXIBLE ARMORED PIPE

TECHNICAL FIELD

The invention relates to a flexible armored pipe and more preferably to an unbonded flexible pipe of the type which can be used for transportation of fluids offshore, such as oil and/or gas fluids.

BACKGROUND ART

Flexible pipes of the present type for offshore transportation of fluids are well known in the art and are for example described in "Recommended Practice for Flexible Pipe", API 17 B, second Edition, 1998, which provides a standard for such pipes. Such pipes usually comprise an inner liner also often called an inner sealing sheath or an inner sheath, which forms a barrier against the outflow of the fluid which is conveyed through the pipe, and one or more armor layers on the outer side of the inner sealing sheath (outer armor layer(s)). Often the flexible pipe also comprises an armor layer on the inner side of the inner sealing sheath, such an armor layer is normally called a carcass and is mainly provided in order to reduce the risk of collapse of the pipe when used under high hydrostatic pressure. An outer sealing sheath may be provided with the object of forming a barrier against the ingress of fluids from the pipe surroundings to the armor layers.

Typical unbonded flexible pipes are e.g. disclosed in WO0161232A1, U.S. Pat. No. 6,123,114, U.S. Pat. No. 6,085,799 and in Recommended Practice for Flexible Pipe, API, 17B, Fourth edition, July 2008, and in Specification for Unbonded Flexible Pipe, API, 17J, third edition, July 2008.

The term "unbonded" means in this text that at least two of the layers including the armor layers and polymer layers are not bonded to each other. In practice the known pipe normally comprises at least two armor layers located outside the inner sealing sheath. These armor layers are not bonded to each other directly or indirectly via other layers along the pipe. Thereby the pipe becomes bendable and sufficiently flexible to roll up for transportation.

The outer armor layer(s) often comprises one or more helically wound elongate elements, such as a wire, which for example can be profiled and optionally interlocked.

For example flexible pipes with a pressure armor layer of profiled and interlocked elongate elements are well known. U.S. Pat. No. 6,065,501 for example discloses a reinforced flexible tube with an armor layer of helically wound elongate reinforcing element with a T-shaped cross-sectional profile. The helically wound elongate reinforcing element with a T-shaped cross-sectional profile may be interlocked with another elongate element having a cross-section with a T-shape mounted in the reverse direction or with a corresponding U-shaped cross-sectional profile.

U.S. Pat. No. 6,889,717 discloses a flexible pipe with at pressure vault (pressure armor layer) with an external face and an internal face placed over the internal sheath, the vault consisting of the winding, in a helix with a short pitch and with a gap between turns, of a metal profile wire interlocked from below by a fastener wire, where the fastener wire has substantially the same height as the profile wire and is interlocked, with no nominal radial contact, below the neutral fiber of the wire (that is to say the fiber where there is no elongation during spiraling, at the centre of mass of the cross section of the wire). The profile wire may have I-shaped cross section or "psi" ψ shaped cross section. The fastener may have a T-shaped cross section.

A flexible pipe of the above type will often be subjected to high axial forces due to high pressure on the outer side of the pipe and/or due to high pressure in the bore of the pipe. Even in situations where an armor layer is made from interlocked profiles, these profiles may have a tendency to slide out over each other with subsequent damage to the pipe.

This problem has been solved with the construction described in U.S. Pat. No. 6,739,355. In this construction the armor layer comprises primary, spirally-wound profiles provided with at least two recesses in which a profile of another kind referred to as a locking profile, is placed, whereby a locking of the primary, spirally-wound profiles against mutual, uncontrolled, axial displacement is achieved. This structure is generally called the K-profile structure. In a variation thereof the locking profile has been integrated into the K profile, which along one of its edges is provided with a recess and along its other edge is provided with the locking profile in the form of a tongue corresponding to the recess. In this way, it becomes possible to avoid the use of locking elements, which can have certain advantages from the point of view of production technique.

DISCLOSURE OF INVENTION

It is an object of the present invention to provide a flexible pipe with an armor layer comprising a new configuration of helically wound elongate elements that reduces the risk of the elongate elements sliding radially out over each other, while simultaneously being relatively simple to produce and resulting in a strong and durable armoring layer compared to prior art armoring layers of corresponding materials and thickness.

This object has been achieved by the invention and embodiments thereof as defined in the claims and as described in the following.

The unbonded flexible pipe of the invention has surprisingly shown to be both relatively simple to produce and simultaneously it has been found that the risk of undesired twists or even buckling has been highly reduced.

The unbonded flexible pipe of the invention is particularly suitable for transportation of fluid, such a hydrocarbon containing fluids under dynamic situations e.g. between sub sea installations, between a well production and a surface installation, however, it may be useful for transportation of any fluids in particular offshore transportation of fluids and transportation of fluids under high pressure.

The flexible armored pipe of the invention has a centre axis and a length and comprises an inner sealing sheath forming a barrier against outflow of the fluid transported in the pipe and at least one armor layer which is a displacement reduced armor layer. The inner sealing sheath defines the bore of the pipe in which fluids can be transported. In most situations the pipe will have a substantially circular cross-section but it may also have other shapes such as oval.

The displacement reduced armor layer comprises a plurality of elongate elements comprising at least a female type elongate element with a first cross-sectional profile and a male type elongate element with a second cross-sectional profile. Each of the female type and the male type elongate elements are substantially symmetrical in a symmetry line substantially normal (perpendicular to a tangent plane of the inner sealing sheath) to the inner sealing sheath when the pipe is in a non-bended state. The elongate elements including the female type elongate element(s) and the male type elongate element(s) are helically wound to provide elongate element windings of alternately a female type elongate element winding and a male type elongate element winding along the length of the pipe.

The female type elongate element windings have a first and a second opposite side facing adjacent male type elongate element windings and comprising each at least one recess.

The male type elongate element windings have a first and a second opposite side facing adjacent female type elongate element windings and comprising each at least one protruding tongue. The protruding tongues of the male type elongate element windings are laterally engaged in the recesses of adjacent female type elongate element windings.

The term "laterally" means an engagement of adjacent windings of elongate elements in a direction which is substantially perpendicular ±15 degrees to the winding angle of the elongate elements relative to the axis of the pipe.

The term "radially engaged" means an engagement of adjacent windings of elongate elements in radial direction ±15 degrees. A radially engagement of adjacent windings of elongate elements is also called an interlocking, because it restricts the movements of the adjacent windings of elongate elements such that the formation of gaps is limited to a selected size also called "play".

Adjacent windings of elongate elements which are radially engaged i.e. interlocked will also be laterally engaged. Adjacent windings of elongate elements which are interlocked are racially engaged or folded into each other.

By providing that the female type elongate element(s) and the male type elongate element(s) are substantially symmetrical in a symmetry line substantially normal to the inner sealing sheath it has shown to be very simple to wind the elongate elements without twisting the elongate element and/or without introducing undesired inhomogenities in the windings of the elongate elements. The displacement reduced armor layer provided by the female type elongate element(s) and male type elongate element(s) has further shown to be very strong compared to prior art armor layers. It is believed that this increase in strength—in particular against buckling—is a result of the very homogeneous winding of the elongate elements simultaneously with the laterally engaged tongues/recesses which lock the female type elongate element(s) and the male type elongate element(s) together such that the risk of displacement of adjacent windings of elongate elements is highly reduced simultaneously with reduction of twists of the elongate elements.

The term "substantially" is herein meant to include what is normally within ordinary production tolerances.

The displacement reduced armor layer may be any armor layer of the pipe. In one embodiment the pipe comprises two or more displacement reduced armor layers.

In one embodiment the flexible armored pipe comprises a carcass arranged radially inside the inner sealing sheath, and the carcass is a displacement reduced armor layer.

The term "radially" concerning arrangement of layers of the pipe is used herein to mean "in radial direction relative to the axis of the pipe.

The term "axial direction" means axial direction along the axis of the pipe

In one embodiment the flexible armored pipe comprises a pressure armor layer arranged radially outside the inner sealing sheath, and the pressure armor being the displacement reduced armor layer.

The elongate elements including the female type elongate element(s) and the male type elongate element(s) may be wound with any desired winding angle, such as for example with an angle of about 80 degrees or more relative to the axis of the pipe.

The pipe of the invention is preferably an unbonded flexible pipe. In one embodiment at least the displacement reduced armor layer is not bonded directly or indirectly to any polymer layers, preferably the displacement reduced armor layer is not bonded directly or indirectly to the inner sealing sheath. In one embodiment none of the armor layers of the pipe are bonded, directly or indirectly to each other.

In one embodiment the protruding tongues of the male type elongate element windings protrude exclusively in one direction. This one direction may be substantially lateral, or it may be a direction between lateral and radial, however such that the overall engagement becomes lateral. By providing the displacement reduced armor layer such that the protruding tongues of the male type elongate element windings protrude exclusively in one direction, it may be relatively easy to wind the elongate element and ensure that the tongues engage with the recesses as desired.

In one embodiment the protruding tongues of the male type elongate element windings are exclusively laterally engaged with recesses of adjacent female type elongate element windings. The lateral engagement provides a high security against radial displacement of the wound elongate elements. In a variation of this embodiment the protruding tongues of the male type elongate element windings are mainly laterally engaged, but are also engaged slightly angled to the lateral direction without thereby providing an interlocking with recesses of adjacent female type elongate element windings.

In one embodiment the protruding tongues of the male type elongate element windings are exclusively engaged laterally and accordingly are not engaged in a radial direction with recesses of adjacent female type elongate element windings. It should be understood that the male type elongate element windings and the female type elongate element windings can comprise additional protruding elements which may be engaged in any way e.g. interlocked.

Whether it is desired if the elongate elements of the displacement reduced armor layer should only engage laterally to reduce the risk of displacement or if they should engage both laterally to reduce the risk of displacement and engage radially to reduce the risk of undesired large gaps between windings of the elongate element(s), depends on the type of armor and the type of unbonded flexible pipe in question. In situations where the pipe in use is likely to be subjected to force which will act to form undesired large gaps between windings of the elongate element(s), it is preferred that the elongate elements of the displacement reduced armor layer should be both laterally and radially engaged, whereas if this is not the case it may be sufficient to provide the elongate elements such that they are only laterally engaged.

In one embodiment the protruding tongues of the male type elongate element windings and the recesses of the female type elongate element windings are laterally engaged and not interlocked, and the respective male type and female type elongate elements comprises additional protruding parts (e.g. flanges or additional protruding tongues) and recesses which in adjacent windings are interlocked.

In one embodiment the protruding tongues of the male type elongate element windings and the recesses of the female type elongate element windings are laterally engaged and not interlocked, and adjacent male type elongate element windings and female type elongate element windings are interlocked using one or more locking elements.

In situation where there is a radial engagement between the female type elongate element windings and the male type elongate element windings it is in one embodiment preferred that this radial engagement is arranged such that adjacent windings are allowed to separate from each other to a predetermined distance, such as about 1-10 mm e.g. up to about 5 mm, or in some situations up to about 2 mm only.

In one embodiment the first and a second opposite side of the female type elongate element(s) of the displacement reduced armor layer has each one single recess and accordingly the first and a second opposite side of the male type elongate element(s) has one single tongue each.

In one embodiment the first and a second opposite side of the female type elongate element(s) of the displacement reduced armor layer has each two recess. In this embodiment the first and a second opposite side of the male type elongate element(s) may have one single tongue each or they may each have two tongues.

In situations where the female type elongate element windings comprise more recesses than the male type elongate element windings comprise tongues, the non-filled recesses may be applied to guide away gases and/or a sensor such as a fiber sensor may be applied in the recess such as it is known from U.S. Pat. No. 7,024,941. The additional recess may also have the function of reducing weight of the displacement reduced armor layer which is often desired. By applying one or more additional recesses which do not engage with a corresponding tongue, the moment of inertia of the displacement reduced armor layer may be increased without increasing the weight of the displacement reduced armor layer.

In one embodiment the female type elongate element windings comprise two or more recesses in each of its first and second sides.

In one embodiment the male type elongate element windings comprise two or more protruding tongues in each of its first and second sides, the protruding tongues are engaged in the recesses of adjacent female type elongate element windings. Preferably the male type elongate element windings do not comprise more protruding tongues than the female type elongate element windings comprise recesses.

In one embodiment the female type elongate element windings additionally comprise a protruding tongue in each of its first and second sides and the male type elongate element windings additionally comprise a recess in each of its first and second sides, the additional tongues are engaged in the additional recesses.

In one embodiment the protruding tongues of the male type elongate element windings are shaped to fit into and substantially fill out the recesses of adjacent female type elongate element windings. By providing the protruding tongues of the male type elongate element windings such that they fit into and substantially fill out the recesses of adjacent female type elongate element windings, the displacement reduced armor layer is particularly resistant against displacement and the armor is very stable and strong.

In one embodiment the protruding tongues of the male type elongate element windings are shaped to fit into the recesses, leaving a helical gap between the respective tongue and recess. This helical gap may be applied to guide away gases and/or a sensor such as a fiber sensor may be applied in the recess such as it is known from U.S. Pat. No. 7,024,941. Alternatively the helical gap may simply have the function of reducing the weight of the armor layer and/or increasing moment of inertia.

In one embodiment the tongues of the male type elongate element windings and corresponding recesses of the adjacent female type elongate element windings comprises a rounded section. Preferably the tongues of the male type elongate element windings seen in cross section have a substantially semicircular form and the recesses of the female type elongate element windings has a corresponding concavity. Thereby high bendability of the resulting pipe can be obtained.

In one embodiment the alternating female type elongate element windings and male type elongate element windings are arranged with no additional elements between the respective adjacent female type and male type windings. In this situation the whole of the first and a second opposite side of the female type elongate element windings or the male type elongate element windings face the first and a second opposite side of adjacent elongate element windings, and preferably the sides that face each other are in contact or are capable of being in contact with each other, such that not all sides facing each other need to be in contact simultaneously.

In one embodiment the alternating female type elongate element windings and male type elongate element windings are arranged with at least one distance element to regulate or control the distance between the respective adjacent female type and male type windings in particular during production of the flexible pipe. The distance element can in principle be arranged anywhere provided that it can perform its function.

The distance element has mainly the function to regulate or control the distance between the respective adjacent female type and male type windings during production of the pipe, and in particular to ensure a control of gabs and plays (the variations the gabs can have in the final pipe) during the application of the layer radially outside the displacement reduced armor layer, such as a carcass. The distance element may further reduce wear between alternating female type elongate element windings and male type elongate element windings.

The distance element will be further described below.

In one embodiment, the alternating female type elongate element windings and male type elongate element windings are arranged with at least one distance element between the respective adjacent female type and male type windings.

In one embodiment the at least one distance element is arranged between respective protruding tongues of said male type elongate element windings and recesses of adjacent female type elongate element winding.

In one embodiment the at least one distance element is arranged closer to the rear side of the male type elongate element than the respective protruding tongues of said male type elongate element windings.

In one embodiment the at least one distance element is arranged closer to the front side of the male type elongate element than the respective protruding tongues of said male type elongate element windings.

The distance element can be loosely applied or wound or it can be attached chemically and/or mechanically to female type elongate element windings and male type elongate element windings.

The female type elongate element(s) and the male type elongate element(s) each have a height determined as the maximal height determined in radial direction perpendicular to the axis of the pipe. In one embodiment the height of respectively the female type elongate element(s) and the male type elongate element(s) differs from each other. The difference in height is in one embodiment up to about 50%. However, in order to have a high stability it is in general desired that the difference in height between the female type elongate element(s) and the male type elongate element(s) does no exceed about 50%.

The percentage difference in height is herein given in relation to the highest of the elements unless anything else is specifically stated.

In one embodiment the female type elongate element(s) and the male type elongate element(s) are up to about 20%, such as up to about 10% different from each other. In situations where there is a substantial difference in height (about 5% or more) between the height of respectively the female type elongate element(s) and the male type elongate element(s), the displacement reduced armor layer may comprise one or more additional elements to totally or partly fill out the height difference. The one or more additional elements may have additional functions e.g. as described below.

In one embodiment the female type elongate element(s) and the male type elongate element(s) have substantially identical height. By providing the female type elongate element(s) and the male type elongate element(s) with substantially identical height a very stable armor structure is obtained, and simultaneously the winding of the female type elongate element(s) and the male type elongate element(s) is relatively easy because the elongate elements are simple to position with respect to each other. Furthermore the armor layer may in one embodiment be made exclusively from the female type elongate element(s) and the male type elongate element(s).

The female type elongate element(s) and the male type elongate element(s) each have a body width, which is determined as the maximal width of the elongate element in a cross-sectional cut perpendicular to the height while excluding any tongues of the male type elongate element(s) and of the female type elongate element(s) if any.

In one embodiment the body width of the female type elongate element(s) and the male type elongate element(s) is substantially identical to each other. When the female type elongate element(s) and the male type elongate element(s) have substantially identical body width winding may be easier, because the force needed to bend the elongate elements during winding thereof will in many situations not differ much from each other when the female type elongate element(s) and the male type elongate element(s) are of the same material.

In one embodiment the body width of respectively the female type elongate element(s) and the male type elongate element(s) is up to about 80%, such as up to about 60%, such as up to about 40%, such as up to about 20%, such as up to about 10% different from each other based on the body width of the elongate element with the largest body width. By having the option of making the body width of the elongate element differ from each other, the distances between gaps of the elongate element windings along the length of the pipe in axial direction can be arranged as desired for the specific application. In this connection it should also be mentioned that the body width of the individual female type elongate element(s) and male type elongate element(s) in one embodiment varies along their respective length for example such that the body width of at least one of the female type elongate element(s) and the male type elongate element(s) is larger in one length section of the pipe than in another length section of the pipe. Such variation of body width is preferably a gradually variation.

The female type elongate element(s) and the male type elongate element(s) each have a front side facing towards the axis of the pipe and a rear side facing away from the axis of the pipe.

In one embodiment at least one of the front side and the rear side of each of the female type elongate element(s) and the male type elongate element(s) are substantially flat. If one of the front side and the rear side of the elongate elements are applied in contact with a polymer sheath, such as the inner sealing sheath it is preferred that this sides of the female type elongate element(s) and the male type elongate element(s) are substantially flat.

By the term "substantially flat" is meant that the side in question of an elongate element when the elongate element is arranged in straight condition is substantially plane and preferably substantially free of tops and/or cavities of about 2 mm or more, preferably substantially free of tops and/or cavities of about 1 mm or more or more or even substantially free of tops and/or cavities of about 0.5 mm or more.

In one embodiment both of the front side and the rear side of each of the female type elongate element(s) and the male type elongate element(s) are substantially flat.

In one embodiment the female type elongate element(s) and the male type elongate element(s) each have a front side facing towards the axis of the pipe, and the front side of each of the female type elongate element(s) and the male type elongate element(s) are substantially flat. The substantially flat front sides of respectively the female type elongate element(s) and the male type elongate element(s) have a front side width, which is the width of the front side in a cross sectional cut through the elongate element.

In one embodiment the front side width of the female type elongate element(s) is substantially identical to the body width of the female type elongate element(s), and the front side width of the male type elongate element(s) is substantially identical to the body width of the male type elongate element(s). In this embodiment the female type elongate element(s) and the male type elongate element(s) respectively have their maximal width immediately adjacent to their respective front surfaces whereby any possible gaps between the female type elongate element windings and the male type elongate element windings can be kept relatively small.

In one embodiment the female type elongate element(s) and the male type elongate element(s) each have a rear side facing away from the axis of the pipe, and the rear side of each of the female type elongate element(s) and the male type elongate element(s) are substantially flat and have rear side widths. In one embodiment the rear side width of the female type elongate element(s) is substantially identical to the body width of the female type elongate element(s) and the rear side width of the male type elongate element(s) is substantially identical to the body width of the male type elongate element(s). In this embodiment the female type elongate element(s) and the male type elongate element(s) respectively have their maximal width immediately adjacent to their respective rear surfaces whereby any possible gaps between the female type elongate element windings and the male type elongate element windings can be kept relatively small.

In one embodiment the front side of a plurality of the female type elongate element windings and/or a plurality of the male type elongate element windings comprises at least one recess, such as preferably one or two recesses. In this embodiment, the flexible armored pipe preferably comprises at least one locking element comprising a first and a second flange protruding away from the axis of the pipe, and each of the first and the second flange of the locking element are engaged in the recess of the front side of one of a female type elongate element winding and a male type elongate element winding, to thereby lock two or more windings to each other. This locking element prevents the female type elongate element windings and the male type elongate element windings from uncontrolled separation from each other in axial direction of the pipe. The recesses may be shaped such that adjacent elongate element windings can move a predetermined distance in axial direction with respect to each other.

In one embodiment the female type elongate element windings and the male type elongate element windings each have a rear side facing away from the axis of the pipe, the rear side of a plurality of the female type elongate element windings and/or a plurality of male type elongate element windings comprises at least one recess, such as preferably one or two recesses, the flexible armored pipe preferably comprises at least one locking element comprising a first and a second flange protruding towards the axis of the pipe, each of the first and the second flange of the locking element are engaged in a recess of the rear side of one of a female type elongate element winding and a male type elongate element winding, to thereby lock two or more windings to each other.

In principle the armor layer may comprise locking elements both on the front sides and on the rear sides of the female type elongate element windings and the male type elongate element windings, however, for simplification of the production it is preferred that the armor layer merely comprises locking element(s) at the rear side of the female type elongate element windings and the male type elongate element windings, because it is much simpler to apply the locking element(s) after having wound the female type elongate element(s) and the male type elongate element(s) to engage with each other.

In one embodiment the at least one locking element is in the form of at least one elongate locking element which is helically wound to provide elongate locking element windings. The elongate locking element may for example be a profiled elongate wire, a profiled elongate polymer element or a folded elongate metal strip. The elongate locking element may for example have a C profile.

In one embodiment the first and the second flanges of the at least one locking element are engaged in recesses of adjacent elongate element windings.

In one embodiment the first and the second flanges of the at least one locking element are engaged in recesses of every second, every third or every fourth elongate element windings.

In one embodiment the first and the second flanges of the at least one locking element are engaged in recesses of elongate element windings of the female type only or of the male type only.

In one embodiment the alternating female type elongate element windings and male type elongate element windings are arranged with at least one distance element as described above to regulate or control the distance between the respective adjacent female type and male type windings in particular during production of the flexible pipe and wherein the at least one distance element is arranged between the locking element and recesses of elongate element windings of the female type and/or of the male type.

The distance element can be loosely applied or wound or it can be attached chemically and/or mechanically attached to the locking element and/or recesses of elongate element windings of the female type and/or of the male type.

In one embodiment the alternating female type elongate element windings and male type elongate element windings are arranged with at least one distance element to regulate or control the distance between the respective adjacent female type and male type windings in particular during production of the flexible pipe and wherein the at least one distance element is arranged between adjacent locking elements or winding of locking elements.

In one embodiment the at least one distance element to regulate or control the distance between the respective adjacent female type and male type windings is in form of one or more helically wound strips and/or in form of a plurality of separate distance elements arranged in helically aligned lines to regulate or control the distance between the respective adjacent female type and male type windings.

In one embodiment the at least one distance element is a hollow element or a solid element. The at least one distance element may for example be a hollow tube, a solid tube, hollow beads or solid beads.

The distance element may have any cross sectionals shapes.

In one embodiment the at least one distance element is a sacrificial elements, which after the production can be fully or partly removed by a solvent or which during use will partly or totally degrade e.g. by being crushed.

In one embodiment the at least one distance element is not a sacrificial elements and it will remain substantially undamaged in the pipe during use.

In this embodiment the at least one distance element should preferably be highly deformable.

In one embodiment the at least one distance element is highly deformable, and preferably can be deformed to at least half thickness, where the thickness is determined as its thickness in lateral direction. The highly deformability of the distance element additionally has the function of being protective against wear to the adjacent female type and male type element windings.

In one embodiment the at least one distance element is a polymer element, preferably of elastomeric material such as one or more polyolefins and/or rubbers, preferably the at least one distance element consist of or comprises silicone.

The female type elongate element(s) and the male type elongate element(s) may be of the same or of different materials. In one embodiment the female type elongate element(s) and the male type elongate element(s) are individually from each other of a material selected from metal, such as steel and aluminum; a coated metal, such as a polymer coated metal; a polymer, such as high density poly ethylene (HDPE), polyvinyldiflourid (PVDF), polyamide (PA), cross-linked polyethylene (PEX), fiber reinforced composite of the mentioned polymers, and combinations of the forgoing. The fiber reinforced composite may for example comprise carbon fibers, glass fibers or other reinforcement fibers.

In one embodiment at least one of the female type elongate element(s) and the male type elongate element(s) is of a metal and at least another one of the female type elongate element(s) and the male type elongate element(s) is of polymer, such as a rubber or such as the above mentioned polymers.

In one embodiment one of the female type elongate element(s) is/are of a first material or combination of materials and the male type elongate element(s) is/are of a second material or combination of materials, where the first and the second material/combination of materials differ from each other.

In one embodiment one of the first and the second material/combination of materials is steel optionally coated with a polymer and the other one of the first and the second material/combination of materials is aluminum optionally coated with a polymer.

In one embodiment one of the first and the second material/combination of materials is metal and the other one of the first and the second material/combination of materials is polymer optionally coated with a polymer.

In one embodiment the displacement reduced armor layer comprises a sensor arrangement e.g., for sensing temperature, pressure, stress or other parameters.

In one embodiment one or more of the female type elongate element(s) and the male type elongate element(s) are of metal optionally coated with a polymer material. The metal may for example be aluminum and/or steel, preferably duplex steel.

Examples of suitable materials are described in any one of U.S. Pat. No. 5,213,637, U.S. Pat. No. 5,407,744, U.S. Pat. No. 5,922,149, U.S. Pat. No. 6,282,933, U.S. Pat. No. 6,291,079, U.S. Pat. No. 6,408,891, U.S. Pat. No. 6,904,939, U.S. Pat. No. 7,459,033 and WO 06097112.

The inner sealing sheath may be of any polymer material which is sufficiently liquid tight and in particular selected from the materials which in the prior art are known to be used for production of inner sealing sheaths of unbonded flexible pipes. In one embodiment the inner sealing sheath is an extruded polymer sheath.

The flexible pipe of the invention is preferably a riser.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the invention including ranges and preferred ranges can be combined in various ways within the scope of the invention, unless there are specific reasons for not combining such features.

Further scope of applicability of the present invention will become apparent from the detailed description given hereinafter. However, it should be understood that the description of drawings and examples, while indicating preferred embodiments of the invention, are given by way of illustration only, as various changes and modifications within the spirit and scope of the invention will become apparent to those skilled in the art from this detailed description.

EXAMPLES AND DESCRIPTION OF DRAWINGS

The invention will be explained more fully below in connection with examples and with reference to the drawings.

FIG. 1 is a schematic side view of a flexible armored pipe of the invention.

FIG. 2 is a cross-sectional view along the length of a flexible pipe of the invention where the layers of the pipe can be seen.

FIG. 3a is a cross-sectional view of a first displacement reduced armor layer where the cross-sectional cut is taken in cross-section of the female type elongate element(s) and the male type elongate element(s).

FIG. 3b is a cross-sectional view of a variation of the first displacement reduced armor layer where the cross-sectional cut is taken in cross-section of the female type elongate element(s) and the male type elongate element(s).

FIG. 4 is a cross-sectional view of a second displacement reduced armor layer where the cross-sectional cut is taken in cross-section of the female type elongate element(s) and the male type elongate element(s).

The figures are schematic and simplified for clarity, and they just show details which are essential to the understanding of the invention, while other details are left out. Throughout, the same reference numerals are used for identical or corresponding parts.

Figure 5:
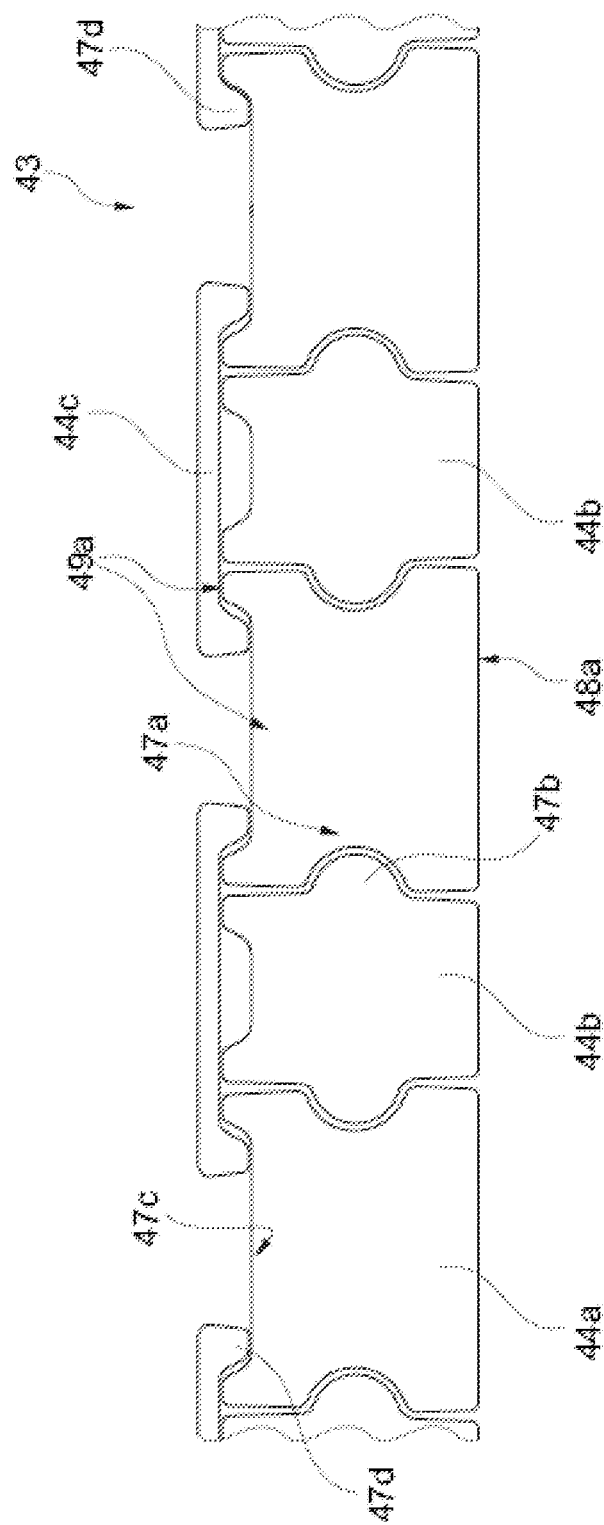
FIG. 5 is a cross-sectional view of a third displacement reduced armor layer where the cross-sectional cut is taken in cross-section of the female type elongate element(s) and the male type elongate element(s).

The flexible pipe shown in FIG. 1 comprises an inner sealing sheath 5, often also called an inner liner, e.g. of high density poly ethylene (HDPE) cross linked polyethylene (PEX), Polyvinyldifluorid (PVDF) or polyamide (PA). The inner sealing sheath has the purpose of preventing outflow of the fluid transferred in the bore of the pipe, indicated with the arrow. Inside the inner sealing sheath 5 the pipe comprises an inner armoring layer 6, called a carcass which is normally of metal, and has the main purpose of reinforcing the pipe against collapse as described above. The carcass 6 is not liquid tight. On the outer side of the inner sealing sheath 5, the flexible pipe comprises a pressure armoring layer 3 which is often of helically wound armoring element(s) of metal or composite material, which is wound with an angle to the axis of the pipe of about 65 degrees or more e. about 85 degrees. The pressure armoring layer 3 is not liquid tight.

Outside the pressure armoring layer 3, the pipe comprises two cross wound tensile armoring layers 2a, 2b wound from elongate armoring elements. The elongate armoring elements on the innermost tensile armoring layer 2a are wound with a winding degree of about 55 degrees or less to the axis of the pipe in a first winding direction and the outermost tensile armoring layer 2b is wound with a winding degree of about 60 degrees or less, such as between about 20 and about 55 degrees to the axis of the pipe in a second winding direction which is the opposite direction to the first winding direction. This two armoring layers with such opposite winding direction are normally referred to as being cross wound. The pipe further comprises an outer sealing sheath 1 protecting the armoring layer mechanically and against ingress of sea water. As indicated with the reference number 4, the unbonded flexible pipe preferably comprises anti-friction layers between the armoring layers 3, 2a, 2b. The anti-friction layers are not liquid tight, and may for example be in the form of a wound film.

The pipe of the invention may have more or less layers than the pipe of FIG. 1 and some layers may be replaced by other layers provided that the pipe comprises at least one inner sealing sheath and a displacement reduced armor layer. For example the pipe may be without a carcass, the outer sealing sheath 1 may be replaced by a water permeable protection layer for providing mechanical protection, additional polymer layers—often called intermediate sealing sheath—may be applied between the respective armor layers, insulating layers may be applied anywhere and/or layers with low gas permeability may be arranged to protect the armor layer(s). The type of layers and order of layers may e.g. be as described in documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and/or WO 2008077409, as well as in Specification for Unbonded Flexible Pipe, API, 17J, Third edition, July 2008 and/or in Recommended Practice for Flexible Pipe, API, 17B, Fourth edition, July 2008, provided that at least one armor layer is a displacement reduced armor layer as described herein.

In FIG. 2 an example of an unbonded flexible pipe of the invention with layers as in FIG. 1 is shown.

The unbonded flexible pipe of the invention comprises from inside and outwards a carcass 16, an inner sealing sheath 15, a pressure armoring layer 13, two cross wound tensile armoring layers 12a, 12b and an outer sealing sheath 11. The term "BORE" indicates the bore in which a fluid can be transported.

The carcass 16 is made from profiled elongate elements 16a, 16b with a profile shaped as a T, where at least two T-shaped profiled elongate elements 16a, 16b are wound, such that they are turned in opposite direction to each other and engage in each other.

T-shaped profiled elongate elements 16a, 16b are helically wound to provide elongate element windings along the length of the pipe, such that the elongate element windings engage with adjacent elongate element windings.

The pressure armor layer 13 is in the form of a displacement reduced armor layer and comprises a female type elongate element 14a and a male type elongate element 14b.

The female type elongate element 14a is substantially symmetrical in a symmetry line A-A substantially normal to the inner sealing sheath when the pipe is in a non-bended state. The male type elongate element 14b is substantially symmetrical in a symmetry line B-B substantially normal to the inner sealing sheath when the pipe is in a non-bended state. The female type elongate element 14a comprises a recess 17a in each of its sides facing the male type elongate element 14b, and the male type elongate element 14b comprises a protruding tongue 17b in each of its sides facing the female type elongate element 14a, and the protruding tongues 17b of said male type elongate element windings 14b are engaged in the recesses 17a of adjacent female windings 14a.

In a not shown variation of the embodiment shown in FIG. 2, the carcass 16 is replaced by a displacement reduced armor layer similar to the pressure armor layer 13.

In the following examples only the displacement reduced armor layer of the flexible pipe will be described. Other layers of the flexible pipe, including sealing layers and armor layers on the outer side of the inner sealing sheath, may for example be as mentioned above in the description of FIG. 1.

FIG. 3a shows a displacement reduced armor layer 23a similar to the displacement reduced armor layer 13 shown in FIG. 2 made from one or more female type elongate elements 24a and one or more male type elongate elements 24b.

The drawing illustrates a cross-sectional side view taken in cross-section of the female type and male type elongate element(s) 24a, 24b of the displacement reduced armor layer 23a. The displacement reduced armor layer 23a may comprise one single female type elongate element 24a and one single male type elongate element 24b or it may comprise several female type elongate elements 24a and several male type elongate elements 24b, however, the number of female type elongate elements 24a is equal to the number of male type elongate elements 24b. The total number of female type and male type elongate element(s) 24a, 24b and the body width Fw, Mw of the female type elongate element(s) and the male type elongate element(s) have influence on the maximal winding degree, i.e. the lower number of female type and male type elongate element(s) 24a, 24b and the smaller body width Fw, Mw of the female type elongate element(s) 24a and the male type elongate element(s) 24b, the higher the winding degree can be. The winding degree is always determined with respect to the axis of the pipe unless anything else is specifically stated.

The female type elongate element(s) 24a and the male type elongate element(s) 24b are helically wound to provide female type elongate element windings 24a, and male type elongate element windings 24b. Since the cross sectional view of an elongate element is identical to a cross sectional view of the elongate element windings of the elongate element, the same reference numbers are used.

The female type elongate element 24a is substantially symmetrical in a symmetry line A-A substantially normal to the inner sealing sheath when the pipe is in a non-bended state. The male type elongate element 24b is substantially symmetrical in a symmetry line B-B substantially normal to the inner sealing sheath when the pipe is in a non-bended state.

The female type elongate element windings 24a comprise a recess 27a in each of its first and second sides. If desired the female type elongate element windings could have been provided with additional not shown recesses. The male type elongate element windings 24b comprise a protruding tongue 27b in each of its first and second sides. If the female type elongate element windings 24a comprise several recesses, the male type elongate element windings 24b may comprise corresponding protruding tongues.

The protruding tongues 27b of the male type elongate element windings 24b protrude in a lateral direction.

The protruding tongues 27b of the male type elongate element windings 24b are engaged laterally in the recesses 27a of adjacent female windings 24a. The height Fh of the female type elongate element windings 24a is substantially identical to the height Mh of the male type elongate element windings 24b.

As it can be seen the protruding tongues 27b of the male type elongate element windings 24b are shaped to fit into and substantially fill out the recesses 27a of adjacent female type elongate element windings 24a.

The female type elongate element windings 24a have a front side 28a facing towards the axis of the pipe and a rear side 29a facing away from the axis of the pipe. Both the front side 28a and the rear side 29a are substantially flat.

The male type elongate element windings 24b have a front side 28b facing towards the axis of the pipe and a rear side 29b facing away from the axis of the pipe. Both the front side 28b and the rear side 29b are substantially flat.

In a modification of this embodiment the rear sides and the front sides 18a, 28b and the rear sides 29a, 29b are switched such that displacement reduced armor layer 23 of FIG. 3a is turned whereby the side facing the axis of the pipe of FIG. 3a in the modification faces away from the axis of the pipe.

The displacement reduced armor layer 23b shown in FIG. 3b is a variation of the displacement reduced armor layer 23a shown in FIG. 3a and the same reference numbers are used. The displacement reduced armor layer 23b differs from the displacement reduced armor layer 23a in that the female type elongate element windings 24a have a front side 28a which is not flat but comprises a number of cavities or recesses 28c in its surface. Such cavities or recesses 28c may serve to limit or reduce the formation of vortices if the displacement reduced armor layer 23b is a carcass or they may serve to increase friction between the displacement reduced armor layer 23b and an adjacent polymer layer.

FIG. 4 shows a displacement reduced armor layer 33 comprising one or more female type elongate elements 34a and one or more male type elongate elements 34b. And further the displacement reduced armor layer 33 comprises one or more locking elements 34c. The one or more locking elements 34c are in form of elongate locking element(s), but in a variation of this embodiment the one or more locking elements 34c could be in form of a plurality C-shaped clips.

The drawing illustrates a cross-sectional side view taken in cross-section of the elongate elements 34a, 34b, 34c of the displacement reduced armor layer 33. The elongate elements 34a, 34b, 34c of the displacement reduced armor layer 33 are helically wound to provide elongate element windings 34a, 34b, 34c along the length of the pipe.

The female type elongate element 34a and the male type elongate element(s) 34b are substantially symmetrical in a symmetry line substantially normal to the not shown inner sealing sheath when the pipe is in a non-bended state.

The female type elongate element windings 34a comprise a recess 37a in each of its first and second sides. The male type elongate element windings 34b comprise a protruding tongue 37b in each of its first and second sides. The protruding tongues 37b of the male type elongate element windings 34b protrude in a lateral direction.

The protruding tongues 37b of the male type elongate element windings 34b are laterally engaged in the recesses 37a of adjacent female windings 34a. The height Fh of the female type elongate element windings 34a is larger than the height Mh of the male type elongate element windings 34b, thereby making space for the elongate locking element 34c.

As it can be seen the protruding tongues 37b of the male type elongate element windings 34b are shaped to the recesses 37a, leaving a helically gap 37e between the respective tongue 37b and recess 37a.

The female type elongate element windings 34a have a front side 38a facing towards the axis of the pipe and a rear side 39a facing away from the axis of the pipe.

The rear side 39a of the female type elongate element windings comprises at least two recesses 37c. The elongate locking element 34c has a C shaped cross section and comprises a first and a second flange 37d protruding towards the axis of the pipe. Each of the first and the second flange 37d of the locking element 34c are engaged in a recess 37c of the rear side 39a of the female type elongate element windings 34a to thereby lock the female type elongate element windings 34a and the male type elongate element windings 34b to each other.

As mentioned above this embodiment can be varied in several ways, e.g. the locking element(s) could engage with the male type elongate element windings, the locking element(s) could engage at the front side of elongate element windings and etc.

FIG. 5 shows a displacement reduced armor layer 43 comprising one or more female type elongate elements 44a and one or more male type elongate elements 44b. And further the displacement reduced armor layer 43 comprises one or more locking elements 44c. The drawing illustrates a cross-sectional side view taken in cross-section of the elongate elements 44a, 44b, 44c of the displacement reduced armor layer 43. The elongate elements 44a, 44b, 44c of the displacement reduced armor layer 43 are helically wound to provide elongate element windings 44a, 44b, 44c along the length of the pipe.

The female type elongate element 44a and the male type elongate element(s) 44b are substantially symmetrical in a symmetry line substantially normal to the not shown inner sealing sheath when the pipe is in a non-bended state.

The female type elongate element windings 44a comprise a recess 47a in each of its first and second sides. The male type elongate element windings 44b comprises a protruding tongue 47b in each of its first and second sides. The protruding tongues 47b of the male type elongate element windings 44b protrude in a lateral direction.

The protruding tongues 47b of the male type elongate element windings 44b are laterally engaged in the recesses 47a of adjacent female windings 44a.

As it can be seen the protruding tongues 47b of the male type elongate element windings 44b are shaped to fit into and substantially fill out the recesses 47a of adjacent female type elongate element windings 44a.

The female type elongate element windings 44a have a front side 48a facing towards the axis of the pipe and a rear side 49a facing away from the axis of the pipe.

The rear side 49a of the female type elongate element windings comprises a recess 47c. The elongate locking element 44c has a C shaped cross section and comprises a first and a second flange 47d protruding towards the axis of the pipe. Each of the first and the second flanges 47d of the locking element 44c are engaged in a recess 47c of the rear side 49a of the female type elongate element windings 44a to thereby lock the female type elongate element windings 44a and the male type elongate element windings 44b to each other.

Figure 6:
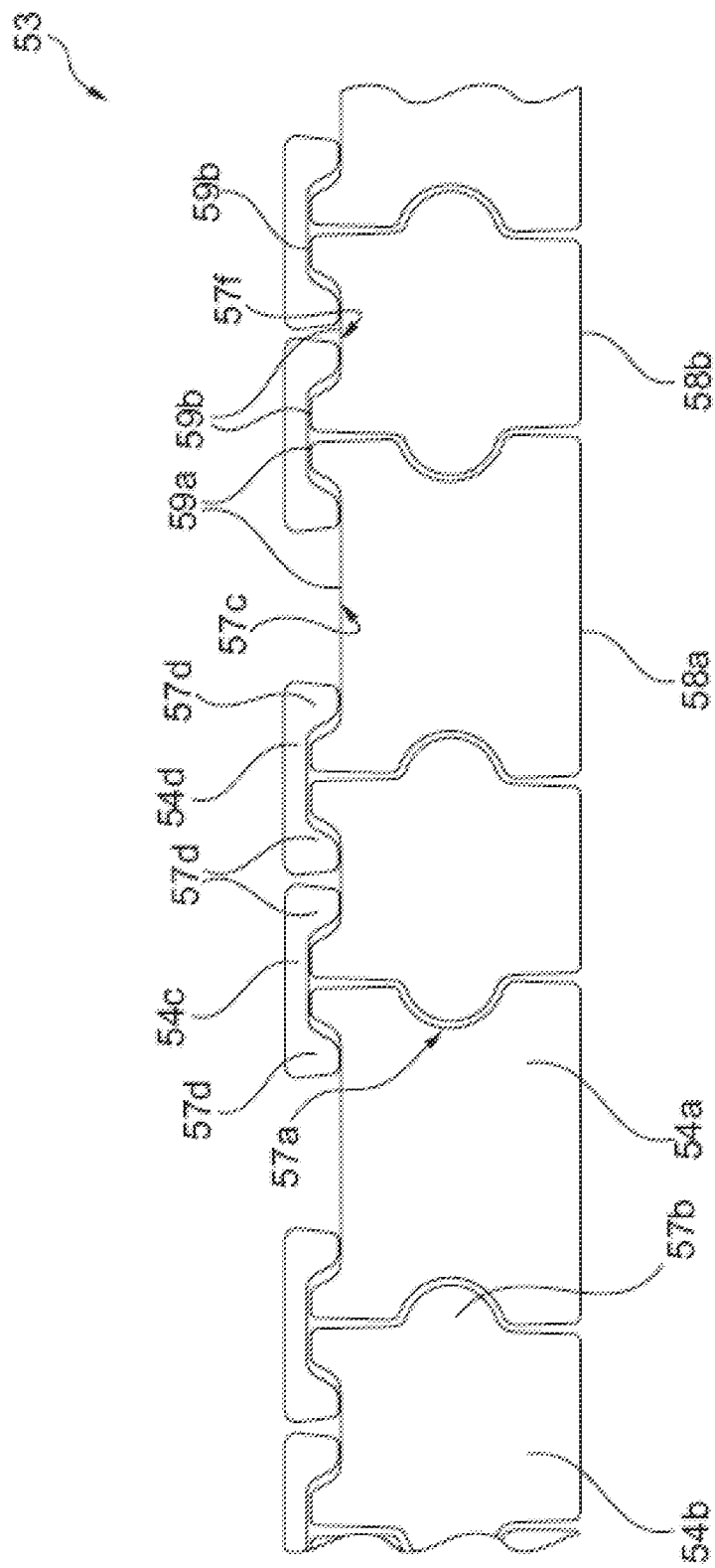
FIG. 6 is a cross-sectional view of a fourth displacement reduced armor layer where the cross-sectional cut is taken in cross-section of the female type elongate element(s) and the male type elongate element(s).

FIG. 6 shows a displacement reduced armor layer 53 comprising one or more female type elongate elements 54a and one or more male type elongate elements 54b. And further the displacement reduced armor layer 53 comprises several locking elements 54c, 54d. The drawing illustrates a cross-sectional side view taken in cross-section of the elongate elements 54a, 54b, 54c, 54d of the displacement reduced armor layer 53. The elongate elements 54a, 54b, 54c of the displacement reduced armor layer 53 are helically wound to provide elongate element windings 54a, 54b, 54c, 54d along the length of the pipe.

The female type elongate element 54a and the male type elongate element(s) 54b are substantially symmetrical in a symmetry line substantially normal to the not shown inner sealing sheath when the pipe is in a non-bended state.

The female type elongate element windings 54a comprise a recess 57a in each of its first and second sides. The male type elongate element windings 54b comprise a protruding tongue 57b in each of its first and second sides. The protruding tongues 57b of the male type elongate element windings 54b protrude in a lateral direction.

The protruding tongues 57b of the male type elongate element windings 54b are laterally engaged in the recesses 57a of adjacent female windings 54a.

The female type elongate element windings 54a have a front side 58a facing towards the axis of the pipe and a rear side 59a facing away from the axis of the pipe. The rear side 59a of the female type elongate element windings comprises a recess 57c.

The male type elongate element windings 54b have a front side 58b facing towards the axis of the pipe and a rear side 59b facing away from the axis of the pipe. The rear side 59b of the male type elongate element windings 54b comprises a recess 57f.

The elongate locking elements 54c have a C shaped cross sections and comprise each a first and a second flange 57d protruding towards the axis of the pipe. Each of the first and the second flanges 57d of each of the locking elements 54c, 54d are engaged in a recess 57c, 57f of respectively the rear side 59a of the female type elongate element windings 44a and the rear side 59a of the male type windings to thereby lock the female type elongate element windings 54a and the male type elongate element windings 54b to each other.

Figure 7:
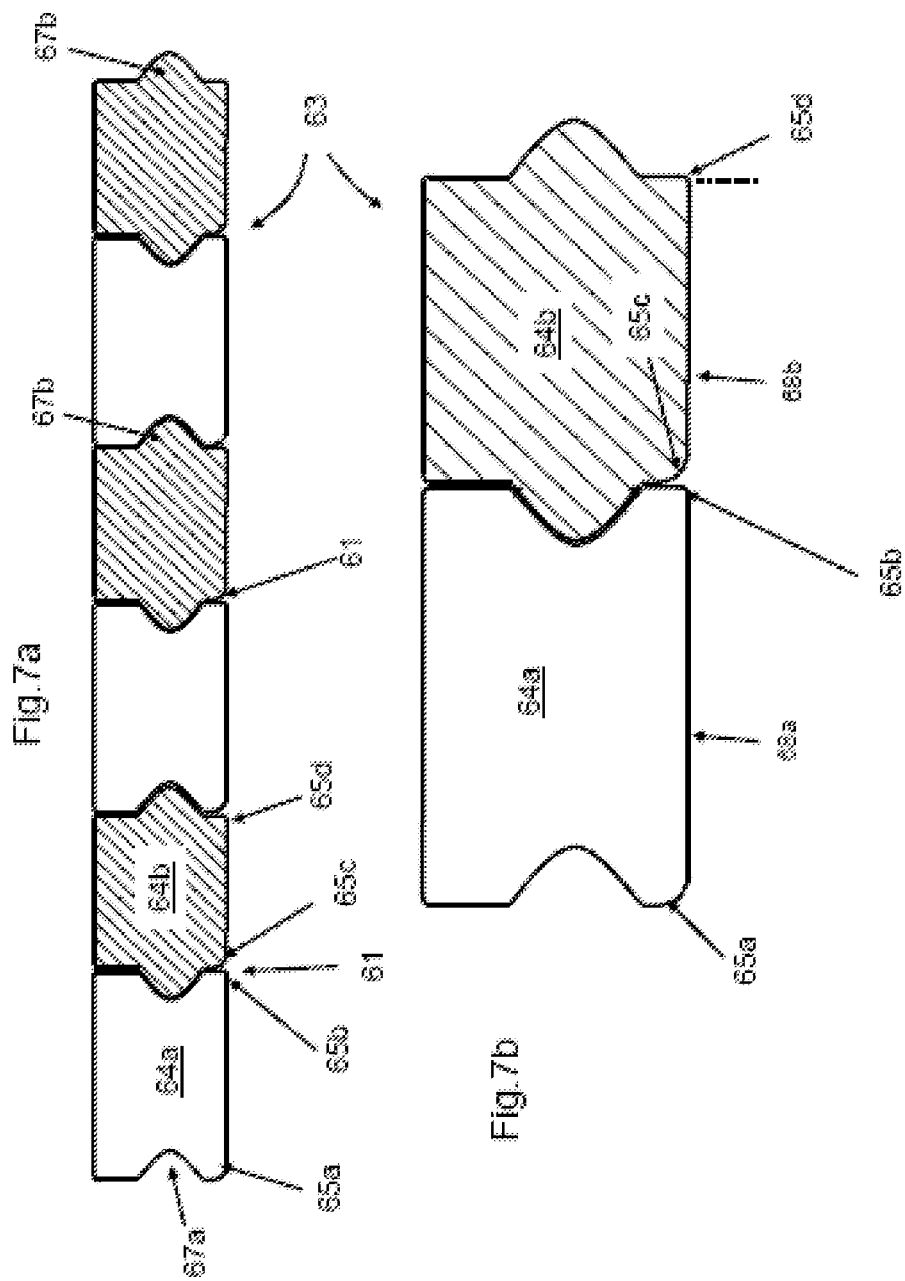
FIGS. 7a and 7b are cross-sectional views of a fifth displacement reduced armor layer where the cross-sectional cut is taken in cross-section of the female type elongate element(s) and the male type elongate element(s).

FIGS. 7a and 7b illustrate another displacement reduced armor layer 63 provided from one or more female type elongate elements 64a and one or more male type elongate elements 64b. The drawings illustrate a cross-sectional side view taken in cross-section of the elongate elements 64a, 64b of the displacement reduced armor layer 63.

The displacement reduced armor layer 63 of this embodiment is preferably arranged to be a carcass of the not shown flexible pipe.

The displacement reduced armor layer 63 comprises a female type elongate element 64a, which is preferably of metal e.g. steel and which is shaped with a mainly rectangular shape with recesses 67a. The displacement reduced armor layer 63 further comprises a female type elongate element 64b, which is of metal or polymer and which is shaped with a mainly rectangular shape with protruding tongues 67b which are engaged with the recesses 67a of the female type elongate element 64a in adjacent elongate element windings.

The female type elongate element(s) 64a and the male type elongate element(s) 64b are helically wound to provide female type elongate element windings 64a, and male type elongate element windings 64b.

Each of the female type elongate element windings 64a and the male type elongate element windings 64b have a front surface 68a, 68b facing the bore and the axis of the pipe. Between adjacent windings of the female type elongate element windings 64a and the male type elongate element windings 64b are small gaps 61. The front surface 68a, 68b of the female type elongate element windings 64a and the male type elongate element windings 64b and the gaps 61 form an inner fluid permeable wall of the displacement reduced armor layer 63.

The front surface 68a, 68b of the female type elongate element windings 64a and the male type elongate element windings 64b each have first and second edges 65a, 65b, 65c, 65d on either side of its respective front surface 68a, 68b. The first and second edges 65a, 65b, 65c, 65d each have a rounding with a rounding diameter, wherein the rounding diameter of the first edge 65a, 65c is larger than the rounding diameter of the second edge 65b, 65d. The selected diameters of the roundings may have influence on the pressure loss of a fluid flowing in the pipe. The flow direction of a fluid to be transported is preferably in the direction from a first to a second edge of the female type elongate element windings 64a and the male type elongate element windings 64b.

Figure 8:
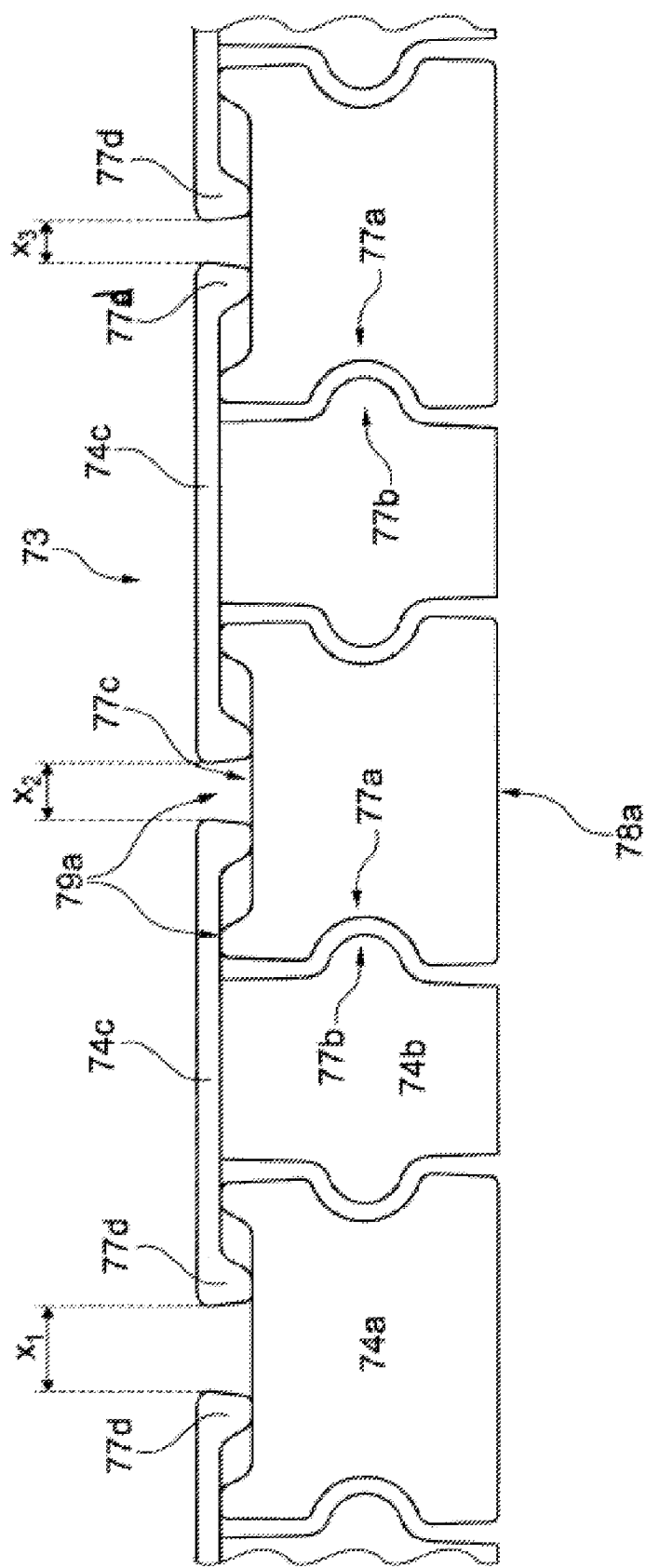
FIG. 8 is a cross-sectional view of a sixth displacement reduced armor layer where the cross-sectional cut is taken in cross-section of the female type elongate element(s) and the male type elongate element(s).

In FIG. 8 is a sixth displacement reduced armor layer is shown. The displacement reduced armor layer of FIG. 8 corresponds in principle to the displacement reduced armor layer of FIG. 5.

The sixth displacement reduced armor layer comprises one or more female type elongate elements 74a and one or more male type elongate elements 74b. And further the displacement reduced armor layer 73 comprises one or more locking elements 74c. The drawing illustrates a cross-sectional side view taken in cross-section of the elongate elements 74a, 74b, 74c of the displacement reduced armor layer 73. The elongate elements 74a, 74b, 74c of the displacement reduced armor layer 73 are helically wound to provide elongate element windings 74a, 74b, 74c along the length of the pipe.

The female type elongate element 74a and the male type elongate element(s) 44b are substantially symmetrical in a symmetry line substantially normal to the not shown inner sealing sheath when the pipe is in a non-bended state.

The female type elongate element windings 74a comprise a recess 77a in each of its first and second sides. The male type elongate element windings 74b comprises a protruding tongue 77b in each of its first and second sides. The protruding tongues 77b of the male type elongate element windings 74b protrude in a lateral direction.

The protruding tongues 77b of the male type elongate element windings 74b are laterally engaged in the recesses 77a of adjacent female windings 74a.

As it can be seen the protruding tongues 77b of the male type elongate element windings 74b are shaped to fit into the recesses 77a of adjacent female type elongate element windings 74a.

The female type elongate element windings 74a have a front side 78a facing towards the axis of the pipe and a rear side 79a facing away from the axis of the pipe.

The rear side 79a of the female type elongate element windings comprises a recess 77c. The elongate locking element 74c has a C shaped cross section and comprises a first and a second flange 77d protruding towards the axis of the pipe. Each of the first and the second flanges 77d of the locking element 44c are engaged in a recess 77c of the rear side 79a of the female type elongate element windings 74a to thereby lock the female type elongate element windings 74a and the male type elongate element windings 74b to each other.

In the displacement reduced armor layer of FIG. 8, the alternating female type elongate element windings 74a and male type elongate element windings 74b are locked together by the elongate locking element 74c to limit the possibly displacement between adjacent female type elongate element windings 74a and male type elongate element windings 74b, however still allowing a distance between adjacent female type elongate element windings 74a and male type elongate element windings 74b. The maximum distance between adjacent female type elongate element windings 74a and male type elongate element windings 74b is referred to as the play.

As it can be seen the play can be regulated by selecting the distance between the first and the second flanges 77d of the locking element 74c. Simultaneously the distance between the flanges 77d of adjacent windings the locking element 74c is regulated. In FIG. 8 is shown 3 different distances X1, X2, X3 between the flanges 77d of adjacent windings the locking element 74c. It should be understood that the distance between adjacent female type elongate element windings 74a and male type elongate element windings 74b simultaneously can vary within the limits of the play.

Figure 9:
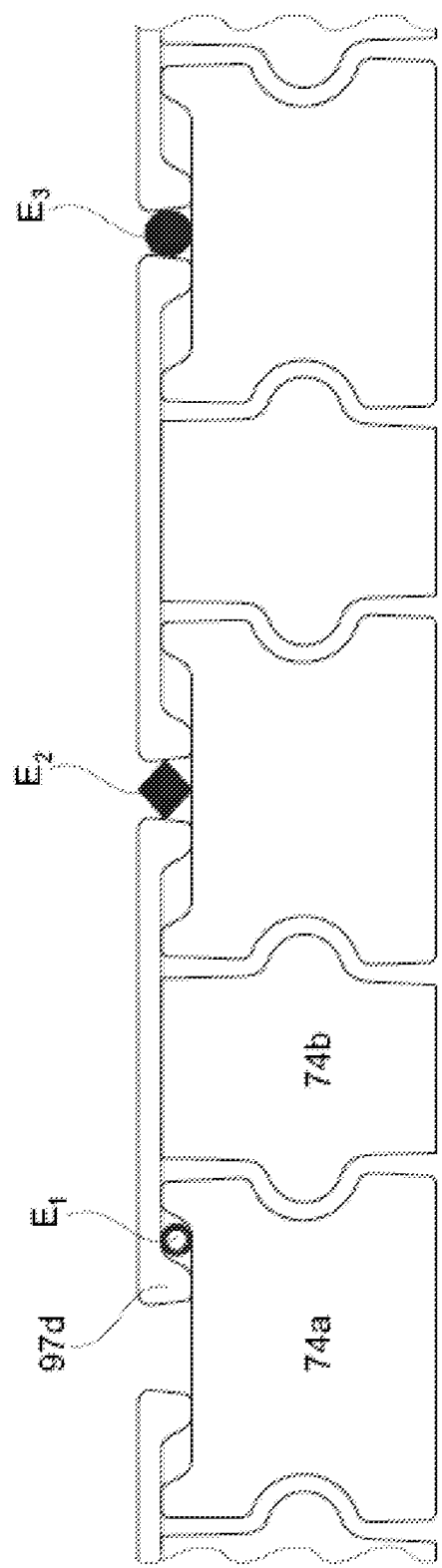
FIG. 9 is a cross-sectional view of a variation of the displacement reduced armor layer shown in FIG. 8, further comprising distance elements.

FIG. 9 shows a variation of the displacement reduced armor layer shown in FIG. 8, further comprising distance elements E1, E2, E3 to regulate or control the distance between the respective adjacent female type and male type windings 74a, 74b. The displacement reduced armor layer is for the illustration shown with 3 different distance elements E1, E2, E3, however it should be understood, that it could have the same or similar distance element in all windings e.g. in form of one or more helically wound strips and/or in form of a plurality of separate distance elements arranged in helically lines to regulate or control the distance between the respective adjacent female type and male type windings 74a, 74b.

As shown the distance elements E1, E2, E3 can be a hollow distance element E1 or a solid distance element E2, E3 e.g. with a round cross section or a square cross section.

Figure 10:
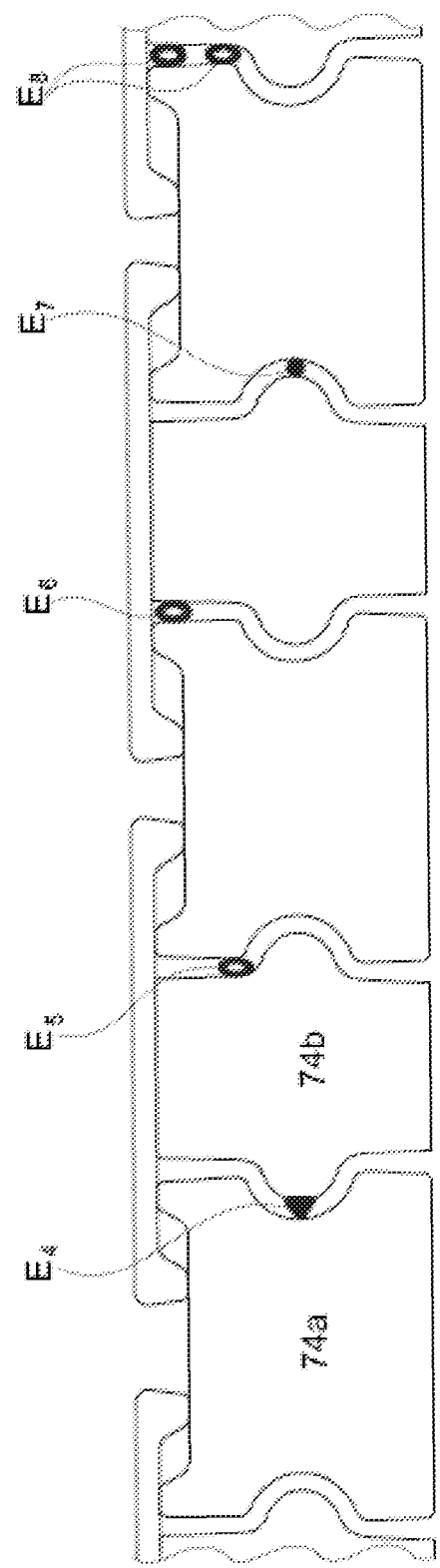
FIG. 10 is a cross-sectional view of another variation of the displacement reduced armor layer shown in FIG. 8, further comprising distance elements.

FIG. 10 shows another variation of the displacement reduced armor layer shown in FIG. 8, further comprising distance elements E4, E5, E6, E7, E8 arranged between and to regulate or control the distance between the respective adjacent female type and male type windings 74a, 74b. The displacement reduced armor layer is for the illustration shown with different distance elements E4, E5, E6, E7, E8, however it should be understood, that it could have the same or similar distance element in all windings e.g. as described above As it can be seen the distance element(s) E4, E7 can be arranged between respective protruding tongues of said male type elongate element windings 74b and recesses of adjacent female type elongate element winding 74a.

Further the distance element(s) can beneficially be arranged closer to the front side of the male type elongate element 74b (i.e. closer to the locking element 74c) than the respective protruding tongues of said male type elongate element windings 74c. If the distance element is to be arranged closer to the rear side of the male type elongate element 74b than the respective protruding tongues of said male type elongate element windings 74b, precaution to ensure that the distance element or parts thereof does not slip into the bore of the pipe should preferably be taken e.g. by attaching the distance element.

The distance elements E0, E1, E2, E3, E4, E5, E6, E7, E8, E9 have mainly the function to regulate or control the distance between the respective adjacent female type and male type windings 74a, 74b during production of the pipe, However, it has shown that the distance elements, when selected to be of elastomeric material, also have a certain protective effect against wear.

Figure 11A:
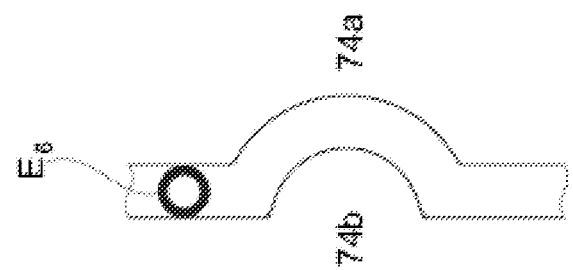
FIGS. 11a, 11b and 11c show a part of adjacent male/female type elongate element windings with distance element of the displacement reduced armor layer shown in FIG. 10.
Figure 11B:
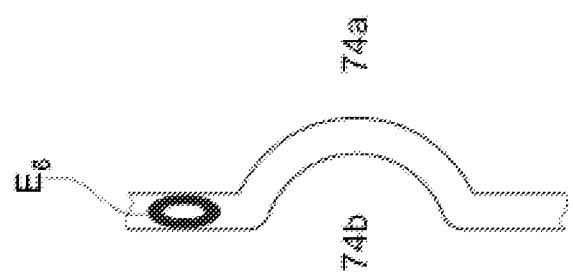
Figure 11C:
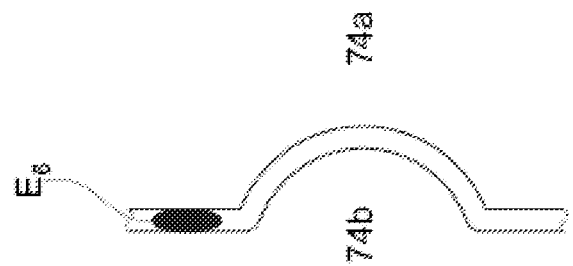

FIGS. 11a, 11b and 11c show a part of adjacent male/female type elongate element windings 74a, 74b with distance element E6 of the displacement reduced armor layer shown in FIG. 10. In FIG. 11a the adjacent male/female type elongate element windings 74a, 74b have maximum distance to each other and the distance element E6 is not compressed. In FIG. 11b the adjacent male/female type elongate element windings 74a, 74b have less distance to each other and the distance element E6 is partly compressed. In FIG. 11c the adjacent male/female type elongate element windings 74a, 74b have minimum distance to each other and the distance element E6 is fully compressed.

Figure 12A:
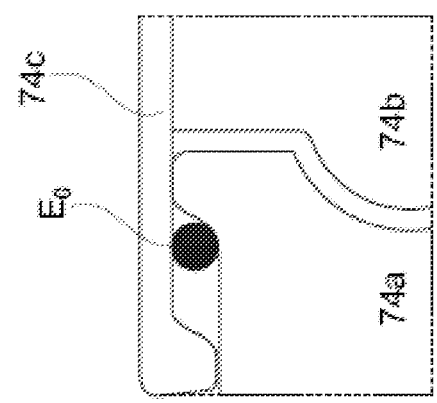
FIGS. 12a, 12b and 12c show a part of adjacent male/female type elongate element windings with distance element.
Figure 12B:
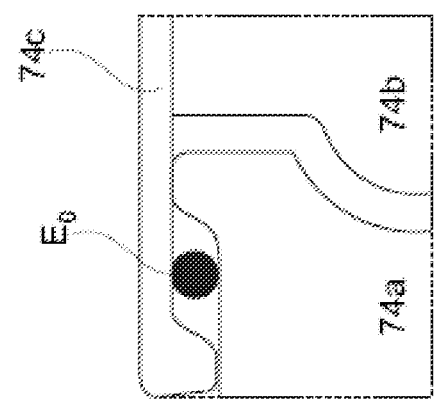
Figure 12C:
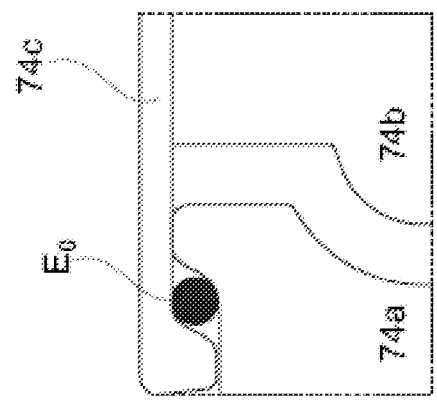

FIGS. 12a, 12b and 12c show a part of adjacent male/female type elongate element windings 74a, 74b with a distance element E0 in form of a helically wound wire or string arranged between the female type elongate element windings 74a and windings of the locking element 74c.

In this embodiment the distance element E0 needs not being elastomeric, but it is a sacrificial element, which after the production can be fully or partly removed by a solvent or which during use will partly or totally degrade e.g. by being crushed.

In FIG. 12a the adjacent male/female type elongate element windings 74a, 74b have minimum distance to each other and the distance element E0 is not compressed but has plenty of space. In FIG. 12b the adjacent male/female type elongate element windings 74a, 74b have more distance to each other and the distance element E0 is almost as in FIG. 12a because the locking element 74c also has certain play between its windings. The distance element E0 is moved slightly to indicate that the locking element 74c has been displaced to allow the adjacent male/female type elongate element windings 74a, 74b to have more distance to each other. In FIG. 12c the adjacent male/female type elongate element windings 74a, 74b have maximum distance to each other and the distance element E0 is blocking for further displacement.

Figure 13B:
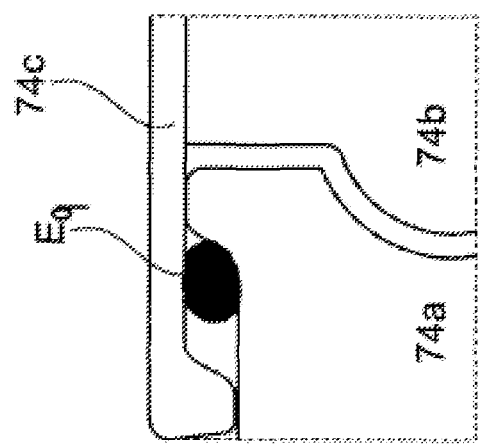
FIGS. 13a and 13b show a variation of the part of adjacent male/female type elongate element windings with distance element of FIGS. 12a, 12b and 12c.
Figure 13A:
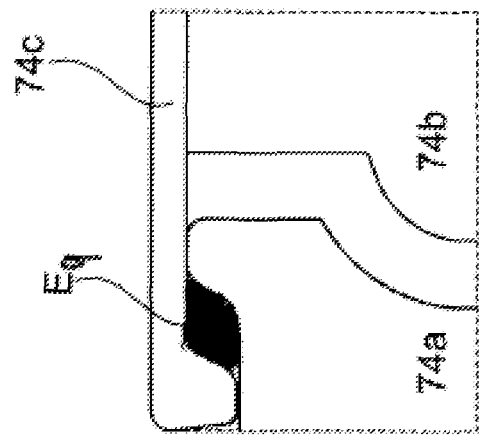

FIGS. 13a and 13b show a variation of the part of adjacent male/female type elongate element windings 74a, 74b FIGS. 12a, 12b and 12c with distance element E9. Distance element E9 is in form of a helically wound wire or string of an elastomeric material arranged between the female type elongate element windings 74a and windings of the locking element 74c.

In this embodiment the distance element E9 needs not being a sacrificial element.

In FIG. 13a the adjacent male/female type elongate element windings 74a, 74b have minimum distance to each other and the distance element E96 is not compressed in laterally direction. In FIG. 13b the adjacent male/female type elongate element windings 74a, 74b have maximum distance to each other and the distance element E9 is fully compressed.

What is claimed is:

1. A flexible armored pipe for transportation of fluids, having a center axis and a length and comprising an inner sealing sheath and at least one displacement reduced armor layer comprising a plurality of elongate elements comprising at least a female type elongate element with a first cross-sectional profile and a male type elongate element with a second cross-sectional profile that is different from the first cross-sectional profile such that the female type and the male type elongate elements have different respective shapes, each of the female type and the male type elongate elements are substantially symmetrical in a symmetry line substantially normal to the inner sealing sheath when the pipe is in a non-bended state, the elongate elements are helically wound to provide elongate element windings of alternately a female type elongate element winding and a male type elongate element winding along the length of the pipe, the female type elongate element windings have a first and a second opposite side facing adjacent male type elongate element windings and comprising each a recess, the male type elongate element windings has a first and a second opposite side facing adjacent female type elongate element windings and comprising each a protruding tongue, wherein said protruding tongues of said male type elongate element windings are laterally engaged in said recesses of adjacent female type elongate element windings, and wherein the protruding tongues of the male type elongate element windings are engaged with the recesses of the adjacent female type elongate element windings in a direction that is perpendicular to a winding angle of the male type or the female type elongate element windings relative to the center axis of the pipe.

2. The flexible armored pipe as claimed in claim 1, wherein the protruding tongues of the male type elongate element windings protrude exclusively in one direction.

3. The flexible armored pipe as claimed in claim 1 wherein the protruding tongues of the male type elongate element windings are engaged laterally with recesses of adjacent female type elongate element windings without said protruding tongues being interlocked in said recesses.

4. The flexible armored pipe as claimed in claim 1, wherein the protruding tongues of the male type elongate element windings are not radially engaged with recesses of adjacent female type elongate element windings.

5. The flexible armored pipe as claimed in claim 1, wherein the female type elongate element windings comprise two or more recesses in each of its first and second sides.

6. The flexible armored pipe as claimed in claim 5, wherein the male type elongate element windings comprise two or more protruding tongues in each of its first and second sides, the protruding tongues are engaged in said recesses of adjacent female type elongate element windings.

7. The flexible armored pipe as claimed in claim 1 wherein the female type elongate element windings additionally comprise a protruding tongue in each of its first and second sides and the male type elongate element windings additionally comprise a recess in each of its first and second sides, the additional tongues are engaged in the additional recess.

8. The flexible armored pipe as claimed in claim 1 wherein the protruding tongues of said male type elongate element windings are shaped to fit into and substantially fill out the recesses of adjacent female type elongate element windings.

9. The flexible armored pipe as claimed in claim 1 wherein the protruding tongues of said male type elongate element windings are shaped to fit into the recesses of adjacent female type elongate element windings, leaving a helical gap between the respective tongue and recess.

10. The flexible armored pipe as claimed in claim 1 wherein the alternating female type elongate element windings and male type elongate element windings are arranged with no additional elements between the respective adjacent female type and male type windings.

11. The flexible armored pipe as claimed in claim 1, wherein the alternating female type elongate element windings and male type elongate element windings are arranged with at least one distance element to regulate or control the distance between the respective adjacent female type and male type windings in particular during production of the flexible pipe.

12. The flexible armored pipe as claimed in claim 1 wherein the alternating female type elongate element windings and male type elongate element windings are arranged with at least one distance element between the respective adjacent female type and male type windings.

13. The flexible armored pipe as claimed in claim 12, wherein the at least one distance element is arranged between respective protruding tongues of said male type elongate element windings and recesses of adjacent female type elongate element winding.

14. The flexible armored pipe as claimed in claim 1 wherein female type elongate element(s) and the male type elongate element(s) each have a height determined as the maximal height determined in radial direction perpendicular to the axis of the pipe, the height of respectively the female type elongate element(s) and the male type elongate element(s) being up to about 20% different from each other.

15. The flexible armored pipe as claimed in claim 1 wherein the female type elongate element(s) and the male type elongate element(s) each have a height determined as the maximal height determined in radial direction perpendicular to the axis of the pipe, the height of respectively the female type elongate element(s) and the male type elongate element(s) being substantially identical.

16. The flexible armored pipe as claimed in claim 1 wherein the female type elongate element(s) and the male type elongate element(s) each have a height determined in radial direction perpendicular to the axis of the pipe, and a body width, which is determined as the maximal width of the elongate element in a cross-sectional cut and perpendicular to the height while excluding any tongues, the body width of respectively the female type elongate element(s) and the male type elongate element(s) being up to about 80% different from each other based on the body width of the elongate element with the largest body width.

17. The flexible armored pipe as claimed in claim 1 wherein the female type elongate element(s) and the male type elongate element(s) each have a front side facing towards the axis of the pipe and a rear side facing away from the axis of the pipe, at least one of the front side and the rear side of each of the female type elongate element(s) and the male type elongate element(s) are substantially flat.

18. The flexible armored pipe as claimed in claim 16, wherein the female type elongate element(s) and the male type elongate element(s) each have a front side facing towards the axis of the pipe, the front side of each of the female type elongate element(s) and the male type elongate element(s) are substantially flat and have front side widths, the front side width of the female type elongate element(s) is substantially identical to the body width of the female type elongate element(s) and the front side width of the male type elongate element(s) is substantially identical to the body width of the male type elongate element(s).

19. The flexible armored pipe as claimed in claim 16, wherein the female type elongate element(s) and the male type elongate element(s) each have a rear side facing away from the axis of the pipe, the rear side of each of the female type elongate element(s) and the male type elongate element(s) are substantially flat and have rear side widths, the rear side width of the female type elongate element(s) is substantially identical to the body width of the female type elongate element(s) and the rear side width of the male type elongate element(s) is substantially identical to the body width of the male type elongate element(s).

20. The flexible armored pipe as claimed in claim 1 wherein the female type elongate element windings and the male type elongate element windings each have a front side facing towards the axis of the pipe, the front side of a plurality of the female type elongate element windings and/or a plurality of the male type elongate element windings comprise at least one recess.

21. A flexible armored pipe for transportation of fluids, having a center axis and a length and comprising an inner sealing sheath and at least one displacement reduced armor layer comprising a plurality of elongate elements comprising at least a female type elongate element with a first cross-sectional profile and a male type elongate element with a second cross-sectional profile, each of the female type and the male type elongate elements are substantially symmetrical in a symmetry line substantially normal to the inner sealing sheath when the pipe is in a non-bended state, the elongate elements are helically wound to provide elongate element windings of alternately a female type elongate element winding and a male type elongate element winding along the length of the pipe, the female type elongate element windings have a first and a second opposite side facing adjacent male type elongate element windings and comprising each a recess, the male type elongate element windings has a first and a second opposite side facing adjacent female type elongate element windings and comprising each a protruding tongue, wherein said protruding tongues of said male type elongate element windings are laterally engaged in said recesses of adjacent female type elongate element windings, and wherein the protruding tongues of the male type elongate element windings are engaged with the recesses of the adjacent female type elongate element windings in a direction that is perpendicular to a winding angle of the male type or the female type elongate element windings relative to the center axis of the pipe, wherein the female type elongate element windings and the male type elongate element windings each have a rear side facing away from the axis of the pipe, the rear side of a plurality of the female type elongate element windings and/or a plurality of male type elongate element windings comprise at least one recess.

22. The flexible armored pipe as claimed in claim 20 wherein the flexible armored pipe comprises at least one locking element comprising a first and a second flange protruding away from the axis of the pipe, each of the first and the second flange of the locking element are engaged in a recess of the front side of one of a female type elongate element winding and a male type elongate element winding, to thereby lock two or more windings to each other.

23. The flexible armored pipe as claimed in claim 20 wherein the alternating female type elongate element windings and male type elongate element windings are arranged with at least one distance element to regulate or control the distance between the respective adjacent female type and male type windings in particular during production of the flexible pipe and wherein the at least one distance element is arranged between the locking element and recesses of elongate element windings of the female type and/or of the male type.

24. The flexible armored pipe as claimed in claim 22 wherein the at least one locking element is in the form of at least one elongate locking element which is helically wound to provide elongate locking element windings and wherein the first and the second flanges of the at least one locking element are engaged in recesses of adjacent elongate element windings.

25. The flexible armored pipe as claimed in claim 21 wherein the flexible armored pipe comprises at least one locking element comprising a first and a second flange protruding towards the axis of the pipe, each of the first and the second flange of the locking element are engaged in a recess of the rear side of one of a female type elongate element winding and a male type elongate element winding, to thereby lock two or more windings to each other.

26. The flexible armored pipe as claimed in claim 25 wherein the at least one locking element is in the form of at least one elongate locking element which is helically wound to provide elongate locking element windings and wherein the first and the second flanges of the at least one locking element are engaged in recesses of adjacent elongate element windings.

27. The flexible armored pipe as claimed in claim 25 wherein the alternating female type elongate element windings and male type elongate element windings are arranged with at least one distance element to regulate or control the distance between the respective adjacent female type and male type windings in particular during production of the flexible pipe and wherein the at least one distance element is arranged between the locking element and recesses of elongate element windings of the female type and/or of the male type.

* * * * *